(12) United States Patent
Mehrseresht et al.

(10) Patent No.: US 8,606,835 B2
(45) Date of Patent: Dec. 10, 2013

(54) EFFICIENT KERNEL CALCULATION FOR INTERPOLATION

(75) Inventors: Nagita Mehrseresht, Castle Hill (AU); Alan Valev Tonisson, Beecroft (AU)

(73) Assignee: Canon Kabushiki Kaisha, Tokyo (JP)

( * ) Notice: Subject to any disclaimer, the term of this patent is extended or adjusted under 35 U.S.C. 154(b) by 1475 days.

(21) Appl. No.: 11/961,739

(22) Filed: Dec. 20, 2007

(65) Prior Publication Data

US 2008/0155000 A1    Jun. 26, 2008

(30) Foreign Application Priority Data

Dec. 22, 2006   (AU) .............................. 2006252248

(51) Int. Cl.
*G06F 7/38* (2006.01)
*G06F 17/17* (2006.01)
*G06K 9/32* (2006.01)

(52) U.S. Cl.
USPC ........................... 708/290; 708/313; 382/300

(58) Field of Classification Search
USPC ................... 708/290, 313; 382/300
See application file for complete search history.

(56) References Cited

U.S. PATENT DOCUMENTS

| 5,125,042 | A | * | 6/1992 | Kerr et al. ...................... 382/300 |
| 5,930,407 | A | | 7/1999 | Jensen |
| 7,072,528 | B2 | * | 7/2006 | Han ............................... 382/300 |
| 7,254,281 | B2 | * | 8/2007 | Slavin ........................... 382/298 |
| 7,890,563 | B2 | * | 2/2011 | Beckmann et al. ........... 708/313 |
| 2005/0094207 | A1 | | 5/2005 | Lo et al. |

OTHER PUBLICATIONS

Keys, Roger G., "Cubic Convolution Interpolation for Digital Image Processing", IEEE Transactions on Acoustics, Speech, and Signal Processing, vol. ASSP-29, No. 6, pp. 1153-1160 (Dec. 1981).
Perko, R. et al., "Efficient Implementation of Higher Order Image Interpolation", WSCG Short Communication Papers Proceedings, Feb. 2-6, 2004, Plen, Czech Republic.

* cited by examiner

*Primary Examiner* — Chuong D Ngo
(74) *Attorney, Agent, or Firm* — Fitzpatrick, Cella, Harper & Scinto

(57) ABSTRACT

A method of determining interpolation coefficients (607, 609, 610, 611) of a symmetric interpolation kernel (608) is disclosed. The method comprises determining a first interpolation coefficient (611) from the symmetric interpolation kernel (608) and storing the first interpolation coefficient in a memory (506). The method then determines the value of an intermediate function (310) from symmetrically opposed segments (201, 204) of the kernel, and determines a subsequent interpolation coefficient dependent upon the first interpolation coefficient and the value of the intermediate function.

21 Claims, 9 Drawing Sheets

EFFICIENT KERNEL CALCULATION FOR INTERPOLATION

CROSS-REFERENCE TO RELATED PATENT APPLICATIONS

This application claims the right of priority under 35 U.S.C. §119 based on Australian Patent Application No. 2006252248, filed 22 Dec. 2006, which is incorporated by reference herein in its entirety as if fully set forth herein.

FIELD OF INVENTION

The current invention relates to interpolation of digital media signals such as image, video and audio signals, and in particular to efficient calculation of kernel coefficients that are used in the interpolation.

BACKGROUND

From a terminology perspective, this description is concerned with an underlying continuous signal (also referred to as the source signal) that is sampled, by some process, to produce a sampled signal. Mathematically, the sampled signal is represented by a series of points referred to a coordinate system having an independent variable axis, and a dependent variable axis. The sampled signal is referred to merely as the sampled signal, or as an input sampled signal (if it is to be processed), or as an output sampled signal (if it is output from a process). The disclosed interpolation process is applied to an input sampled signal, which is associated with an underlying continuous signal, to thereby produce a sampled output signal.

In many applications which process a sampled signal, it is required to find the value (of the dependent variable) of the underlying continuous signal at locations (ie at values of the independent variable) for which no sample is available. Interpolation is a process by which the underlying continuous signal can be reconstructed/estimated using the available samples of the sampled signal. Interpolation may also be used to find the value of derivatives of a sampled signal at locations for which no sample is available. In this case the derivative of the underlying continuous signal is estimated using the available samples of the sampled signal.

Interpolation is a fundamental part of many image/video processing applications, such processing including but not being limited to resolution conversion (magnifying and minimizing), warping, rotating, sub-pixel transition and motion estimation.

One conventional interpolation scheme uses a continuous symmetric function (also referred to as a continuous symmetric kernel) such as a piecewise Cubic or Spline, and convolves the input sampled signal with the continuous kernel to reconstruct the original signal. The result of the convolution is calculated at a finite number of output points to produce an output signal that is also a sampled version of the underlying continuous signal. This interpolation process, therefore, finds the value of the underlying signal at a finite number of samples only. For each output sample, a convolution of the kernel, centred at desired point (also referred to as the interpolated sample or the sample to be interpolated or the desired output sample), and the sampled input signal must be calculated.

Interpolation schemes are computationally expensive as the process must be repeated for every output sample. Often this is the main bottleneck in the processing pipeline in question. Calculation of interpolation kernel coefficients (also referred to merely as kernel coefficients or interpolation coefficients, and described in relation to FIG. 1) is typically required for each output sample, and the need for this calculation contributes a significant portion of the typical total computation cost.

One known technique for reducing the cost of kernel calculation involves pre-calculating and storing kernel coefficients in a table. This technique, however, is not suitable for arbitrary rate rescaling as different scaling rates require calculation of the kernel at different points, so a large table is necessary for storing the required kernel coefficients, which involves correspondingly costly pre-calculation.

U.S. Pat. No. 5,930,407 aims to reduce the complexity of Cubic kernel calculation by factorizing the common terms. The complexity of the kernel calculation, however, is still significant.

SUMMARY

It is an object of the present invention to substantially overcome, or at least ameliorate, one or more disadvantages of existing arrangements.

Disclosed are arrangements, referred to as Intermediate Function Kernel Calculation (or IFKC) arrangements which, in regard to a particular symmetric interpolation kernel or an anti-symmetric gradient kernel, comprising continuous kernel segments, seek to address the above problems by using an intermediate function derived from a pair of symmetrically opposed kernel segments to reduce the computational burden in calculating kernel coefficients.

According to a first aspect of the present invention, there is provided a method of determining interpolation coefficients of a symmetric interpolation kernel, C, for interpolating a plurality of media signal input samples to be used to determine an interpolated sample, the method comprising the steps of:

determining a value x, proportional to a distance between the sample to be interpolated and one of said media signal input samples;

determining a first interpolation coefficient from the kernel and storing the first interpolation coefficient it in a memory;

determining an intermediate value proportional to the sum of $C(x+L)$ and $C(x-L-1)$ where the parameter L is a non-negative integer in a kernel support interval;

determining a subsequent interpolation coefficient dependent upon the first coefficient and the intermediate value.

According to another aspect of the present invention, there is provided a method of determining coefficients of an anti-symmetric gradient interpolation kernel for determining the gradient of media signal.

According to another aspect of the present invention, there is provided a method of determining interpolation coefficients of a symmetric interpolation kernel comprising continuous kernel segments, for interpolating a plurality of media signal input samples to be used to determine a desired output sample, the method comprising the steps of:

determining a first interpolation coefficient from the symmetric interpolation kernel and storing the coefficient in memory;

determining a value of an intermediate function from symmetrically opposed segments of the kernel; and determining a subsequent interpolation coefficient dependent upon the first interpolation coefficient and the value of the intermediate function.

According to another aspect of the present invention, there is provided an apparatus for determining interpolation coefficients of a symmetric interpolation kernel, C, for interpolating a plurality of media signal input samples to be used to determine an interpolated sample, the apparatus comprising:

means for determining a value x, proportional to a distance between the sample to be interpolated and one of said media signal input samples;
  means for determining a first interpolation coefficient from the kernel;
  means for determining an intermediate value proportional to the sum of $C(x+L)$ and $C(x-L-1)$ where the parameter L is a non-negative integer in a kernel support interval; and
  means for determining a subsequent interpolation coefficient dependent upon the first coefficient and the intermediate kernel value.

According to another aspect of the present invention, there is provided an apparatus for determining interpolation coefficients of a symmetric interpolation kernel comprising continuous kernel segments, for interpolating a plurality of media signal input samples to be used to determine a desired output sample, the apparatus comprising:

means for determining a first interpolation coefficient from the symmetric interpolation kernel and for storing the coefficient in memory;
  means for determining a value of an intermediate function value based on symmetrically opposed segments of the kernel; and
  means for determining a subsequent interpolation coefficient dependent upon the first interpolation coefficient and the value of the intermediate function.

According to another aspect of the present invention, there is provided an apparatus for determining interpolation coefficients of a symmetric interpolation kernel for interpolating a plurality of media signal input samples to be used to determine an interpolated sample, the apparatus comprising:

a memory for storing a program; and
  a processor for executing the program, said program comprising:
    code for determining a value x, proportional to a distance between the sample to be interpolated and one of said media signal input samples;
    code for determining a first interpolation coefficient from the kernel;
    code for determining an intermediate value proportional to the sum $C(x+L)$ and $C(x-L-1)$ where the parameter L is a non-negative integer in a kernel support interval; and
    code for determining a subsequent interpolation coefficient dependent upon the first coefficient and the intermediate kernel value.

According to another aspect of the present invention, there is provided an apparatus for determining interpolation coefficients of a symmetric interpolation kernel comprising continuous kernel segments, for interpolating a plurality of media signal input samples to be used to determine a desired output sample, the apparatus comprising:

a memory for storing a program; and
  a processor for executing the program, said program comprising:
    code for determining a first interpolation coefficient from the symmetric interpolation kernel and for storing the coefficient in memory;
    code for determining a value of an intermediate function from symmetrically opposed segments of the kernel; and
    code for determining a subsequent interpolation coefficient dependent upon the first interpolation coefficient and the value of the intermediate function.

According to another aspect of the present invention, there is provided a computer program product including a computer readable medium having recorded thereon a computer program for directing a processor to execute a method for determining interpolation coefficients of a symmetric interpolation kernel for interpolating a plurality of media signal input samples to be used to determine an interpolated sample, the program comprising:

code for determining a value x, proportional to a distance between the sample to be interpolated and one of said media signal input samples;
  code for determining a first interpolation coefficient from the kernel;
  code for generating, determining an intermediate value proportional to the sum $C(x+L)$ and $C(x-L-1)$ where the parameter L is a non-negative integer in a kernel support interval; and
  code for determining a subsequent interpolation coefficient dependent upon the first coefficient and the intermediate kernel segment.

According to another aspect of the present invention, there is provided a computer program product including a computer readable medium having recorded thereon a computer program for directing a processor to execute a method for determining interpolation coefficients of a symmetric interpolation kernel comprising continuous kernel segments, for interpolating a plurality of media signal input samples to be used to determine a desired output sample, the program comprising:

code for determining a first interpolation coefficient from the symmetric interpolation kernel and for storing the coefficient in memory;
  code for determining a value of the intermediate function from symmetrically opposed segments of the kernel; and
  code for determining a subsequent interpolation coefficient dependent upon the first interpolation coefficient and the value of the intermediate function.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

Figure 1:
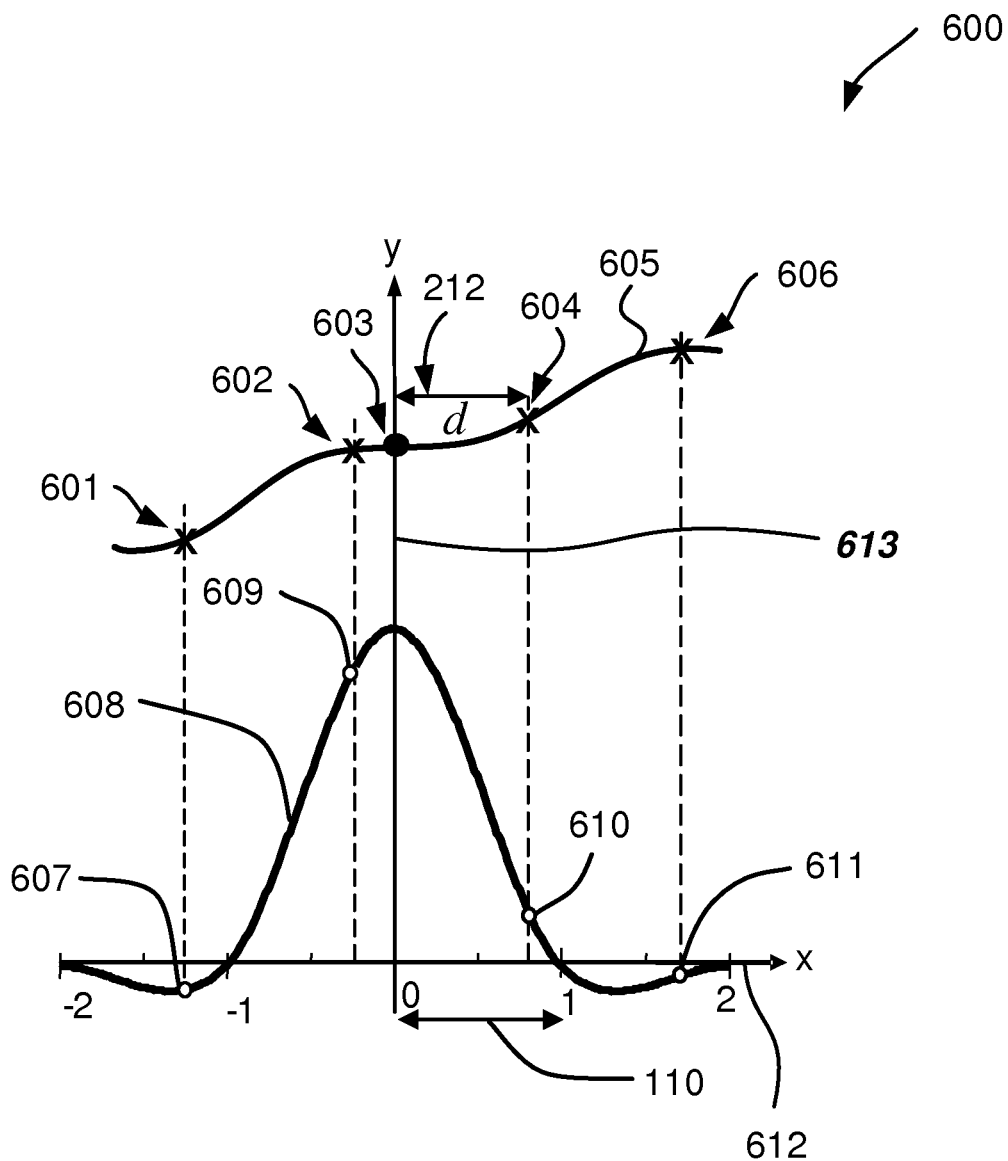
FIG. 1 illustrates the interpolation process.

Where reference is made in any one or more of the accompanying drawings to steps and/or features, which have the same reference numerals, those steps and/or features have for the purposes of this description the same function(s) or operation(s), unless the contrary intention appears.

Basic IFKC Method for Interpolation Kernel Calculation

FIG. 1 depicts the interpolation process. An underlying continuous signal 605 is located on a set of x-y axes designated by respective reference numerals 612, 613. The signal is sampled, and sampled y-values are available at points 601, 602, 604 and 606 (these being input samples). However, the y-value of the continuous signal 605 is also required at a point 603 (being referred to as the interpolated sample or the sample to be interpolated or the desired output sample), and this is to be determined using interpolation.

The y-axis 613 is positioned at the desired point 603. A one-dimensional (1D) symmetrical function 608 (also referred to as a 1D interpolating kernel) is similarly centred at the position of the desired point 603, ie at the y-axis 613.

In order to determine the value of the continuous signal 605 at the point 603, it is necessary to evaluate the function 608 at the x-values associated with the available sampled points 601, 602, 604 and 606. The values of the continuous symmetric function 608 at the aforementioned x-values are designated using respective reference numerals 607, 609, 610 and 611 and are also referred to as the interpolation kernel coefficients. The value of the underlying continuous signal 605 at the point 603 can be estimated using the following mathematical relationship:

$$I_i = \sum_{j=0}^{3} C_j S_j \quad (2)$$

where:

$I_i$ is the estimated value of the underlying function 605 at the point 603;

$S_i = [S0, S1, S2, S3]$ represent the values of the signal 605 at the points 601, 602, 604 and 606; and $C_i = [C0, C1, C2, C3]$ represent the values 607, 609, 610 and 611 of the continuous interpolating function (ie the interpolation kernel coefficients).

This description relates to efficient calculation of kernel coefficients, such as 607, 609, 610 and 611 in FIG. 1, using Intermediate Function Kernel Calculation (IFKC) arrangements. In some examples, the IFKC arrangement utilizes a Cubic function as the continuous interpolating kernel. The IFKC arrangement can be used for up-sampling (i.e., magnifying), down-sampling (i.e., shrinking) and sub-pixel transformation including rotating and shifting.

The interpolating kernel coefficients $C_i$, generally change for each output sample when the input and the output sampling intervals are different, as is the case in re-scaling applications. In such cases, kernel coefficients need to be recalculated for each of a plurality of output samples.

Computation error in calculating kernel coefficients is magnified by the input samples during interpolation, and hence kernel coefficients must be calculated with high accuracy. Direct evaluation of the kernel coefficients requires evaluation of the interpolating kernel 608 at each of the x-values 601, 602, 604, 606 in order to determine the corresponding kernel coefficients 607, 609, 610 and 611. This requirement can be a processing bottleneck in many applications which require fast and accurate interpolation. The described IFKC arrangements are suitable for hardware implementation of arbitrary rate rescaling arrangements. However, the disclosed IFKC arrangements are beneficial for both hardware and software implementations.

Figure 2:
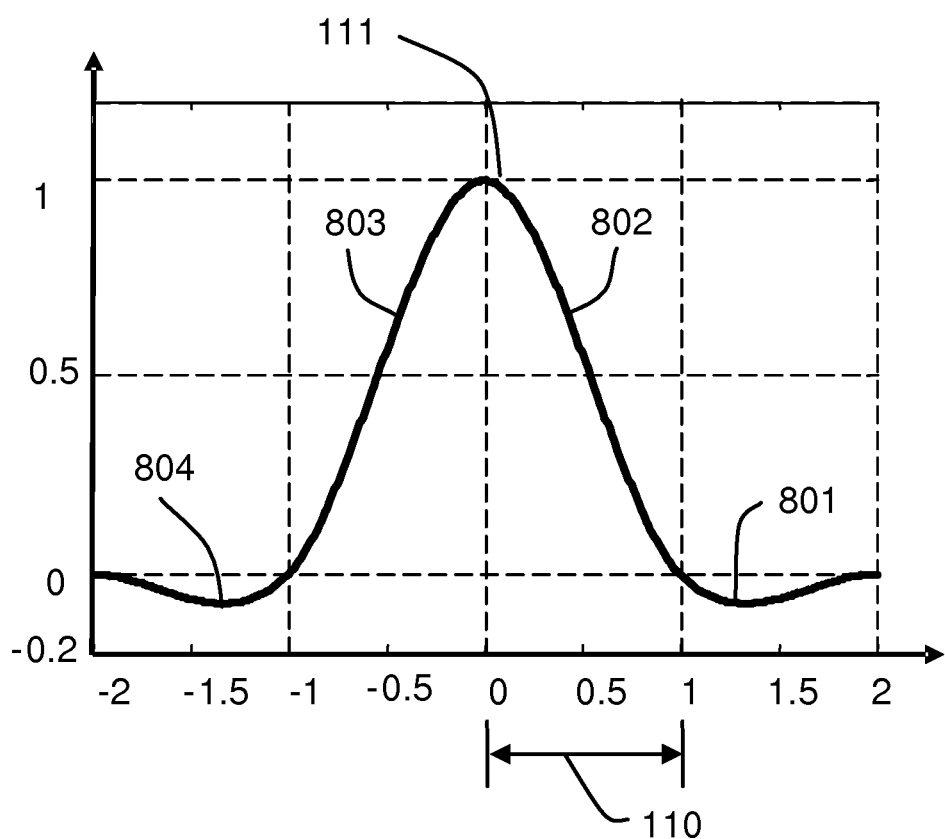
FIG. 2 depicts a one-dimensional piecewise Cubic kernel.

FIG. 2 illustrates a 1D Cubic function 111 which may be used as an interpolating kernel 608 to approximate a continuous source signal using four equally-spaced samples of the kernel. The kernel 111 is defined by the following set of mathematical relationships:

$$C(x, a) = \begin{cases} (a+2)|x|^3 - (a+3)|x|^2 + 1 & 0 \leq |x| < 1 \\ a|x|^3 - 5a|x|^2 + 8a|x| - 4a & 1 \leq |x| < 2 \\ 0 & 2 \leq |x| \end{cases} \quad (1)$$

where:

a is usually referred to as sharpness factor; and x represents distance in kernel coordinates.

In one described arrangement, a=−0.5. Choosing other values for "a" generates an interpolating kernel which either over-smooths or over-sharpens the signal and often results in inferior interpolating quality.

The Cubic function 111 is composed of piecewise cubic polynomial segments defined on subintervals as follows:

| Sub-interval (x-axis) | Piecewise polynomial segment reference number |
|---|---|
| (−2, −1) | 804 |
| (−1, 0) | 803 |
| (0, 1) | 802 |
| (1, 2) | 801 |

Outside the x-axis interval (−2, 2) the Cubic function 111 is zero. The interval outside which the kernel is constantly zero or undefined is called the kernel support interval. Therefore, for the example depicted in FIG. 2, the kernel support interval is given by 0=|x|<2.

In an up-sampling arrangement, each kernel coordinate unit 110 corresponds to the interval between input samples. In a down-sampling configuration, each kernel coordinate unit 110 equals the interval between output samples.

Figure 3:
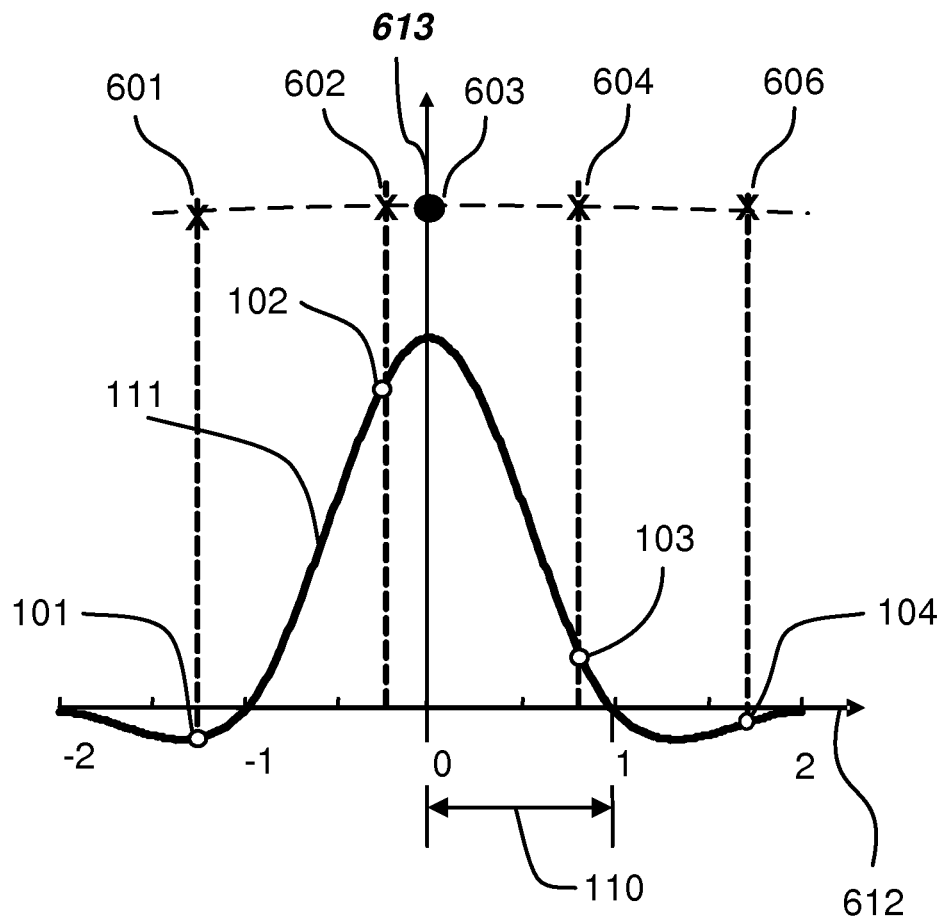
FIG. 3 shows the interpolation process using a piecewise Cubic kernel.

FIG. 3 depicts the interpolation process using a piecewise Cubic function as the interpolating kernel 608. The disclosed IFKC arrangements exploit several properties of the interpolation kernel to minimize the computational cost of kernel coefficient calculation. This is described with reference to FIG. 4.

Figure 4:
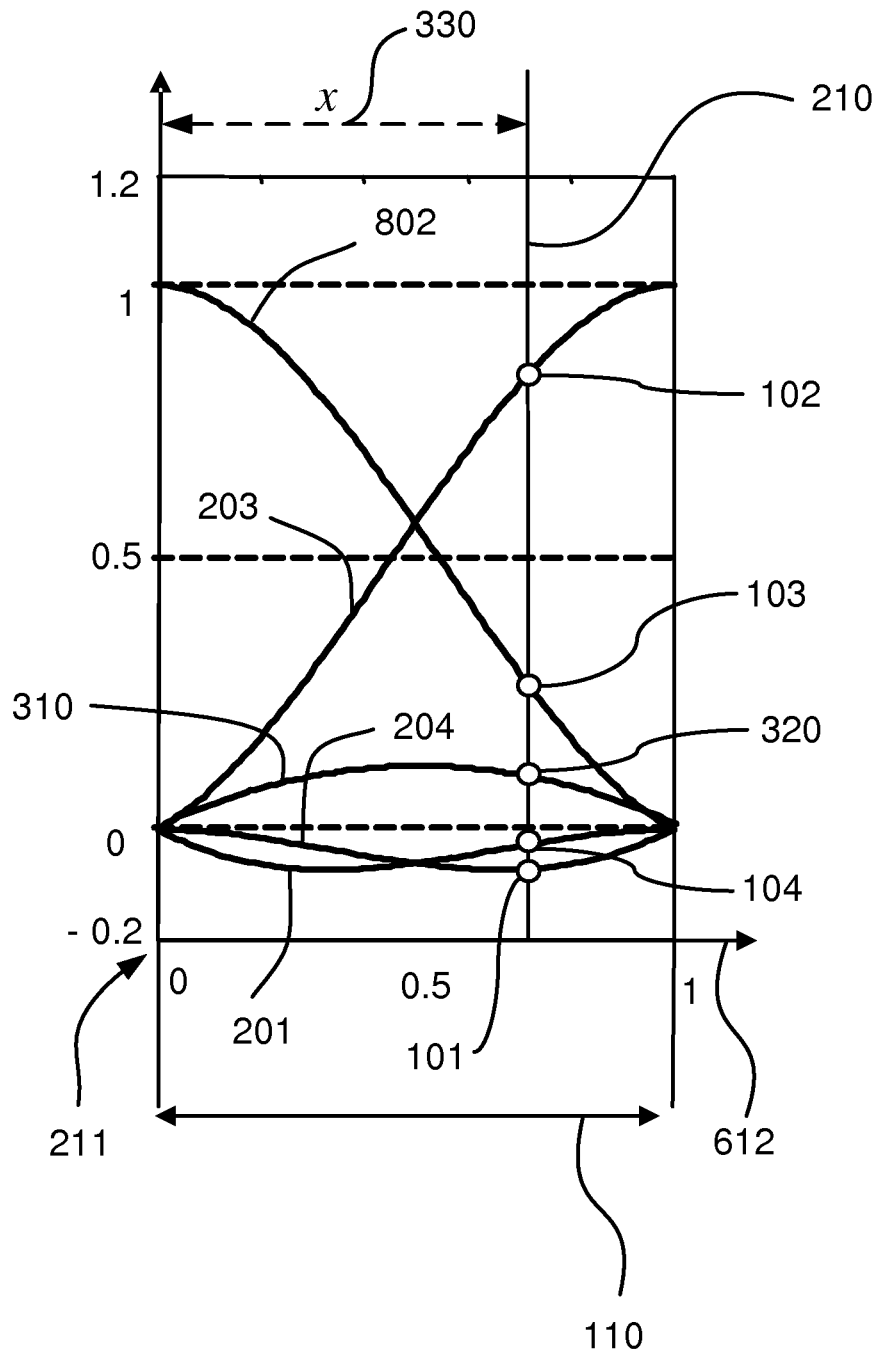
FIG. 4 depicts an intermediate function used for the purpose of calculating kernel coefficients.

FIG. 4 shows the Cubic function 111 (see FIG. 3) in a form in which the segments 801, 803 and 804 (see FIG. 2) which lie outside the x-axis range [0, 1] are shifted to the x-axis range [0, 1]. The shifted versions of the segments 801, 803 and 804 are referred to as 201, 203 and 204 respectively. The segment 802 is not shifted. In this arrangement, by shifting the kernel segments 801, 803 and 804 to the x-axis range [0, 1] all the required kernel coefficients 101, 102, 103 and 104 are aligned along a straight line 210 at a normalized distance "x" (ie 330) from the desired interpolating point (see 603 in FIG. 1). The x value 330 is proportional to the distance "d" in FIG. 1 and is normalized using the kernel coordinate unit 110. The kernel coefficients C0, C1, C2 and C3, (ie 101, 102, 103 and 104 respectively in FIG. 3) therefore can be found by evaluating the polynomial segments 204, 203, 802 and 201 at a single point at distance "x" from the origin 211 of the kernel coordinate system. These polynomial segments are defined in the following set of equations:

$$C0(x,a) = -ax^3 + ax^2 \quad (4)$$

$$C1(x,a) = -(a+2)x^3 + (2a+3)x^2 - ax \quad (5)$$

$$C2(x,a) = (a+2)x^3 - (a+3)x^2 + 1 \qquad (6)$$

$$C3(x,a) = ax^3 - 2ax^2 + ax \qquad (7)$$

The Cubic function defined in the equation (1) is a 4-sample interpolating kernel. Therefore, the sum of any 4 samples of the kernel, spaced one unit apart in the range [−2, 2], is always "1" regardless of the positions of the samples. As a result only 3 kernel coefficients need to be calculated directly by evaluating the polynomials defined in the equations (4) to (7). The $4^{th}$ coefficient is the difference of the sum of the 3 known coefficients and "1". In some examples, the IFKC arrangement uses this property to reduce the kernel calculation cost.

The described IFKC arrangements also use an intermediate polynomial function 310 (also referred to as an intermediate term) henceforth denoted P or P(x), to reduce the computation cost of determining the kernel coefficients. In one example IFKC arrangement, the intermediate polynomial function is proportional to the sum of the symmetrically opposed polynomial segments 201 and 204, and is described by the following equation:

$$P(x) = -C0(x) - C3(x) = -\frac{1}{2}x^2 + \frac{1}{2}x \qquad (8)$$

In an alternative arrangement the intermediate function P is proportional to the sum of the polynomial segments 801 and 203 as follows:

$$P(x) = C1(x) + C2(x) = -\frac{1}{2}x^2 + \frac{1}{2}x + 1 \qquad (9)$$

In yet another arrangement which implements the general form of the Cubic function with an unspecified value for a, P can be defined by one of the following set of equations:

$$P(x) = -C0(x) - C3(x) = ax^2 - ax \qquad (10)$$

$$P(x) = C1(x) + C2(x) = ax^2 - ax + 1 \qquad (11)$$

As is shown in equations (8) to (11), the intermediate polynomial function P is of only quadratic order, as it is defined as the sum of polynomial segments which have same values at x-values "x" and "1−x" and accordingly the cubic term is cancelled. Using the intermediate term P, it is possible to calculate the four required kernel coefficients by directly evaluating only two kernel coefficients. That is, by directly evaluating either C0 or C3 and only one of C1 or C2, the $3^{rd}$ coefficient can be calculated using the definition of P and the $4^{th}$ kernel coefficient is the difference between the sum of 3 known coefficients and one.

The intermediate function is proportional to the sum of C(x+L)+C(x−L−1) where x is proportional to a distance between the sample to be interpolated and one of the media signal input samples, and the parameter L is a non-negative integer in a kernel support interval.

In an example of the IFKC arrangement using Cubic function with a=−0.5, P is defined as in equation (8) and the following set of equations are the polynomials defining the 4 segments of the Cubic function:

$$C0(x) = \frac{1}{2}x^3 - \frac{1}{2}x^2 \qquad (12)$$

$$C3(x) = -P(x) - C0(x) \qquad (13)$$

$$C2(x) = \frac{3}{2}x^3 - \frac{5}{2}x^2 + 1 = -3C3(x) - P(x) - (x-1) \qquad (14)$$

$$C1(x) = 1 + P(x) - C2(x). \qquad (15)$$

Equation (14) shows how further correlation between the kernel segments and the intermediate term P can be exploited to reduce the computation cost of calculating kernel coefficients.

Figure 5:
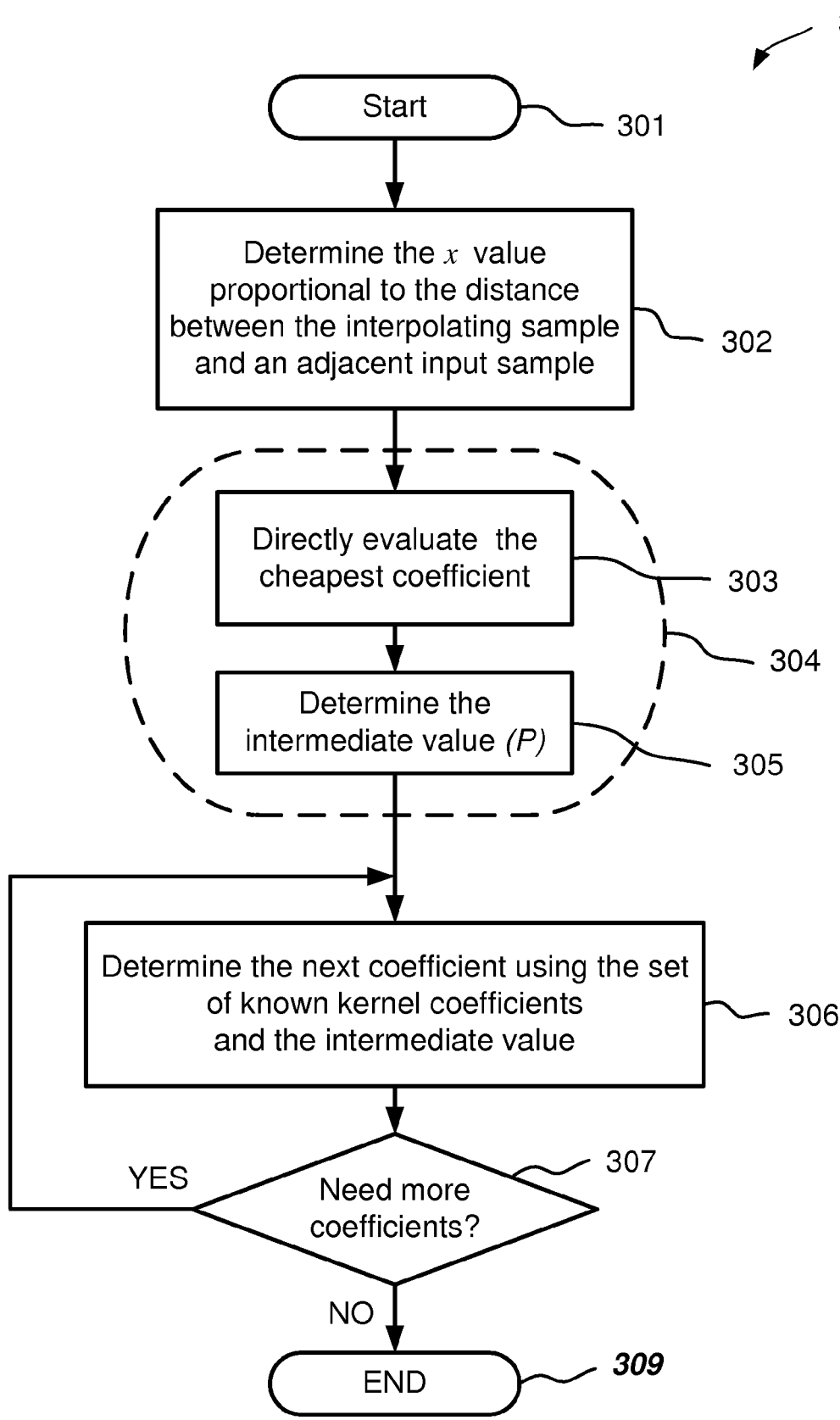
FIG. 5 shows a process for evaluating the interpolation coefficients using the IFKC arrangements.

FIG. 5 shows a process 300 for evaluating the interpolation coefficients using the IFKC arrangements. The process 300 commences with a start step 301 after which a step 302 determines the x value (330 in FIG. 4) in proportion to the distance d (212 in FIG. 1) between the desired point (603 in FIG. 1) and its adjacent input sample (604 in FIG. 1). A following step 303 directly calculates one of the kernel coefficients and stores it in memory. The "cheapest" kernel coefficient, for example, the coefficient 607 (see FIG. 1) which has the simplest describing polynomial and would consume the least computation resources, thus, could be selected for this first calculation.

A subsequent step 305 determines the value of the intermediate function using the x value (330 in FIG. 4) which is determined in the step 302. The value determined by the step 305 is also referred to as the intermediate value (see 320 in FIG. 4 for an example of this intermediate value). The step 305 stores the intermediate value in a memory for use by the step 306. In the example IFKC arrangement for calculating Cubic interpolation coefficients, the intermediate function is defined in relation to the equations (8)-(11). A dashed outline 304 indicates that the steps 303 and 305 can be performed in reverse order if desired.

A subsequent step 306 uses a relevant equation from the set defining the kernel coefficients (see for example equations (13) to (15)) to determine a subsequent kernel coefficient using the set of known kernel coefficients and the intermediate value. The equation (14) is an example of this step. A following decision step 307 determines if any more coefficients are left to be determined. If this is not the case, then the process 300 follows a "NO" arrow from the step 307 and terminates.

If the step 307 establishes a logical "YES" value, then the process 300 follows a "YES" arrow from the step 307 back to the step 306 to calculate the remaining kernel coefficients.

Direct evaluation of Cubic kernel coefficients using equation (1) requires 16 multiplies and 12 summations.

Figure 6:
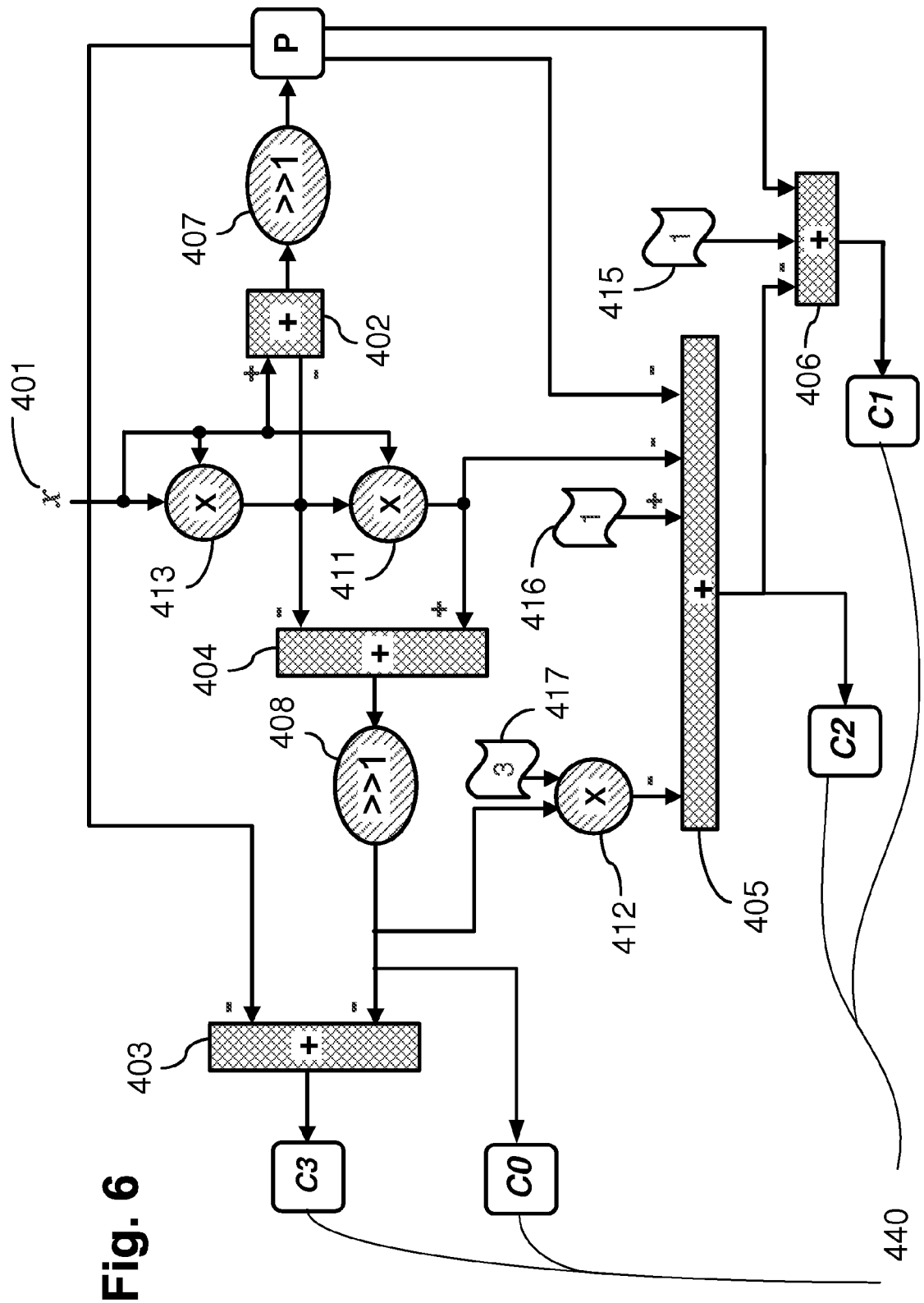
FIG. 6 shows a sample hardware embodiment for the current invention.

FIG. 6 shows a possible hardware implementation of the disclosed IFKC arrangement using the 1D Cubic function of equation (1) with a=−0.5 as the interpolating kernel. It can be seen that the 4 Cubic kernel coefficients (ie C0, C1, C2, C3) (see 101-104 in FIG. 3. for example of kernel coefficients) are calculated using as an input a single normalized distance x 401 (see 330 in FIG. 4). The calculated coefficients are stored in memory elements 441-444. The intermediate value is used for the calculation of C1, C2 and C3 and may also be stored in a temporary memory 445. The arrangement comprises three multipliers 411-413, and 5 adders 402-406 (implementing a total of 8 additions) with two shifters 407 and 408 to implement division by 2. Two of the additions 415, 416, forming parts of adder units 405 and 406, can be simply implemented, as they perform addition with the constant value "1". One other constant value 417 is used, and this further limits the complexity and size of the multiplier unit 412 as it can simply be implemented as a combination of one shift and one addition operation.

In another IFKC arrangement which performs a sharp Cubic interpolation with a==1 the computation cost of kernel coefficient calculation is only two multiplies (to calculate $x^2$ and $x^3$) and 6 summations as is shown in the following set of equations:

$$C0(x)=x^3-x^2 \tag{16}$$

$$P(x)=-x^2+x \tag{17}$$

$$C3(x)=-P(x)-C0(x) \tag{18}$$

$$C1(x)=-x^3+x^2+x=-C0(x)+x \tag{19}$$

$$C2(x)=1+P(x)-C1(x) \tag{20}$$

Equations (16) and (17) are used in the steps 303 and 305 of the described IFKC arrangement (see FIG. 5) and the equations 18 to 20 are used in the step 306.

Similar methods of simplification can be used in an IFKC arrangement which implements a Cubic function with any sharpness parameter a as is defined in equation (1). In one such IFKC arrangement, the step 305 in FIG. 5 calculates the intermediate value using equation (10) and the step 303 uses equation (4) to calculate C0. The step 306 then calculates the remaining kernel coefficient using the following set of equations:

$$\begin{aligned} C3(x) &= -P(x) - C0(x) \\ C2(x) &= -\frac{a+2}{a}C0(x) - x^2 + 1 \\ C1(x) &= 1 + P(x) - C2(x). \end{aligned} \tag{21}$$

Such an IFKC arrangement calculates the set of kernel coefficient corresponding to a Cubic function with unspecified sharpness factor "a" with 5 multiplies and 7 summations only.

The disclosed IFKC arrangements can also be used in convolution-based interpolation using other symmetric functions as the base kernel. The Cubic B-spline is one such kernel shown in the following set of equations:

$$C_{B-spline}(x) = \frac{1}{6}\begin{cases} 3|x|^3 - 6|x|^2 + 4 & 0 \le |x| < 1 \\ -|x|^3 + 6|x|^2 - 12|x| + 8 & 1 \le |x| < 2 \\ 0 & 2 \le |x| \end{cases} \tag{22}$$

Equation (22) includes a general scaling of ⅙ which can be shifted from kernel calculation to the interpolation with the input samples. An overall kernel scale factor can generally be accommodated without extra computation cost by integrating the scaling operation with other required scaling operations in the processing pipeline. In the worst case, scaling can be implemented directly by scaling the interpolated value at the cost of one multiply per interpolated sample.

Direct evaluation of the kernel coefficients (C0, C1, C2 and C3) using equation (22) required 20 multiplies and 10 summation operations. The following set of equations is used in the steps 303, 305 and 306 (see FIG. 5) of an IFKC arrangement which performs Cubic B-spline kernel calculation with 5 multiplies and 7 summations:

$$C0(x)=x^3$$

$$P(x)=-3x^2+3x-1=3(-x^2+x)-1$$

$$C3(x)=-C0(x)-P(x)$$

$$C1(x)=-3C0(x)-P(x)-6x$$

$$C2(x)=6-C1(x)-P(x) \tag{23}$$

A further extension of the IFKC arrangement uses longer kernels, for example Cubic function with fourth order convergence rate as described in the following set of equations:

$$C(x) = \begin{cases} \frac{7}{9}|x|^3 - \frac{7}{3}|x|^2 + 1 & 0 \le |x| < 1 \\ -\frac{7}{12}|x|^3 + 3|x| - \frac{59}{12}|x| + \frac{5}{2} & 1 \le |x| < 2 \\ \frac{1}{12}|x|^3 - \frac{2}{3}|x|^2 + \frac{7}{4}|x| - \frac{3}{2} & 2 \le |x| < 3 \\ 0 & 3 \le |x| \end{cases} \tag{24}$$

This kernel has zero value outside the range of (−3, 3) and approximates the continuous source signal using six samples of the input signal. Six samples of the kernel are therefore needed to perform interpolation. In an example IFKC arrangement which calculates the kernel coefficients based on the Cubic function with fourth order convergence rate (see equation (24)), the steps 303 and 305 (see FIG. 5) use equations (25) and (26) to calculate the first kernel coefficient and the intermediate value as follows:

$$C0(x)=-x^3+x^2 \tag{25}$$

$$P(x)=-x^2+x \tag{26}$$

The following set of equations is then used in the step 306 to calculate the remaining kernel coefficients:

$$C5(x)=P(x)-C0(x)$$

$$C4(x)=-7C5(x)-P(x)$$

$$C1(x)=-9P(x)-C4(x)$$

$$C2(x)=16C0(x)-4P(x)+12x$$

$$C3(x)=12+8P(x)-C2(x) \tag{27}$$

In the described IFKC arrangements a general rescaling of 1/12 is also shifted from the kernel coefficient calculation to the interpolation process. The interpolated sample calculated for example using equation (2) should then be multiplied by 1/12 if this scaling is not accommodated within the other processes in the processing pipeline.

The described example IFKC arrangement calculates the 6 required kernel coefficients using 3 multiplies, 3 shifts and 9 additions. The calculation of the kernel coefficients requires 34 multiplies and 16 summation operations when calculated directly using the equation (24).

It is thus apparent that the IFKC arrangements and the corresponding described simplification methods can be used to reduce the computation cost for any continuous symmetric kernel that can be approximated by polynomial segments, such as the exponential and Sinc functions.

Figure 7:
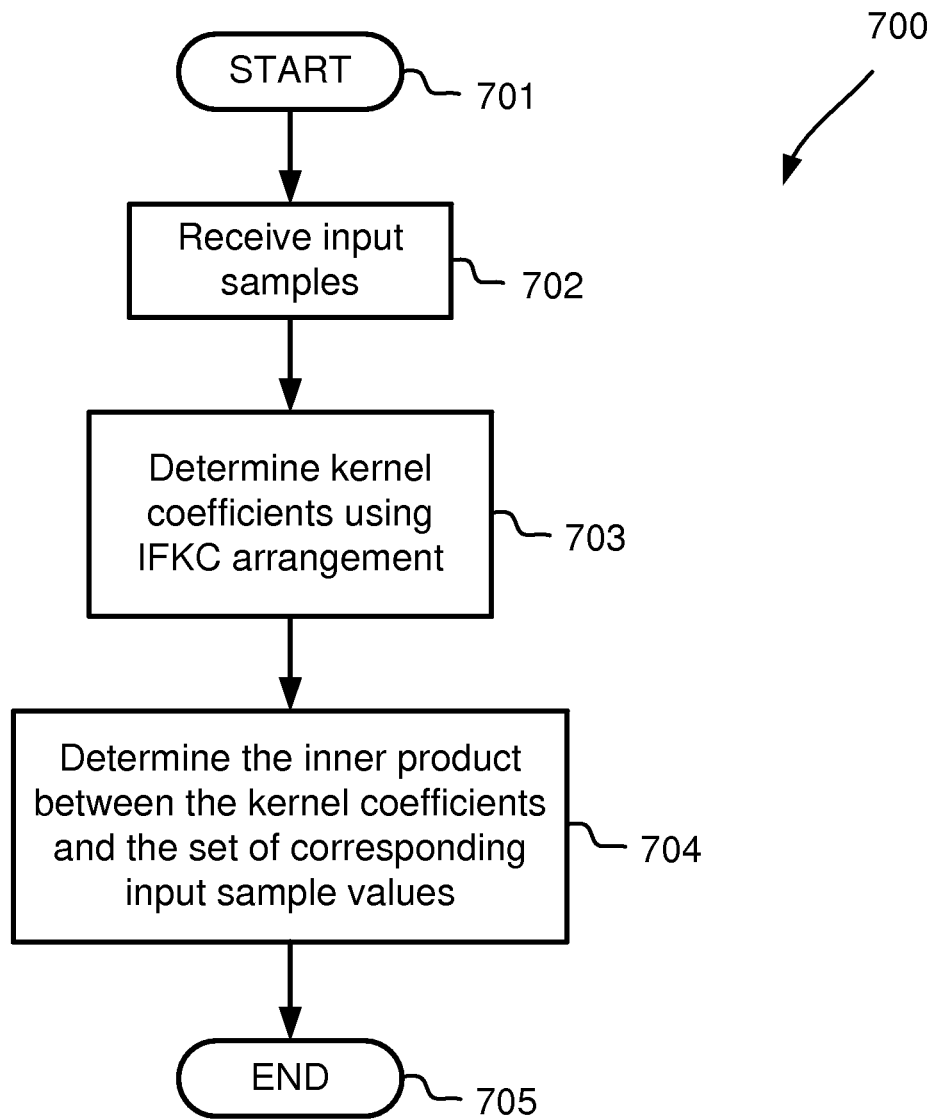
FIG. 7 is a flow chart showing an example of how the interpolation can be performed using the IFKC arrangement.

FIG. 7 is a flow chart showing an example process 700 of how the IFKC arrangement is used for interpolation. The process 700 commences with a start step 701, after which a step 702 receives the input samples such as 601, 602, 604 and 606 in FIG. 1. A following step 703 determines the kernel coefficient such as 607, 609, 610 and 611 using an IFKC arrangement as described in relation to in FIG. 5. The IFKC arrangement is selected based on the desired continuous kernel. This kernel can be selected from at least Cubic function (equation (1)), cubic B-splines (equation (22)) and Cubic function with fourth-order convergence rate (equation (24)) where the equations required for the steps 303, 305 and 306 are explicitly given in the descriptions of the different sample IFKC arrangement. Other continuous symmetric functions can also be used in the IFKC arrangement where the described shifting (see FIG. 4), intermediate term calculation and the other simplification methods can be used to derive the required equations for the steps 303, 305 and 306. A following step 704 performs the interpolation operation as described, for example, in regard to the equation (2). The process 700 then terminates with a step 705.

Extending IFKC Method to Derivative Kernel Calculation

Similar IFKC arrangements can also be used to determine the coefficients of a derivative kernel. Derivative kernels could be formed by finding the derivative of continuous interpolation kernels (e.g., Cubic, B-Spline) and are used to estimate the derivate of sampled input signal.

Figure 9:
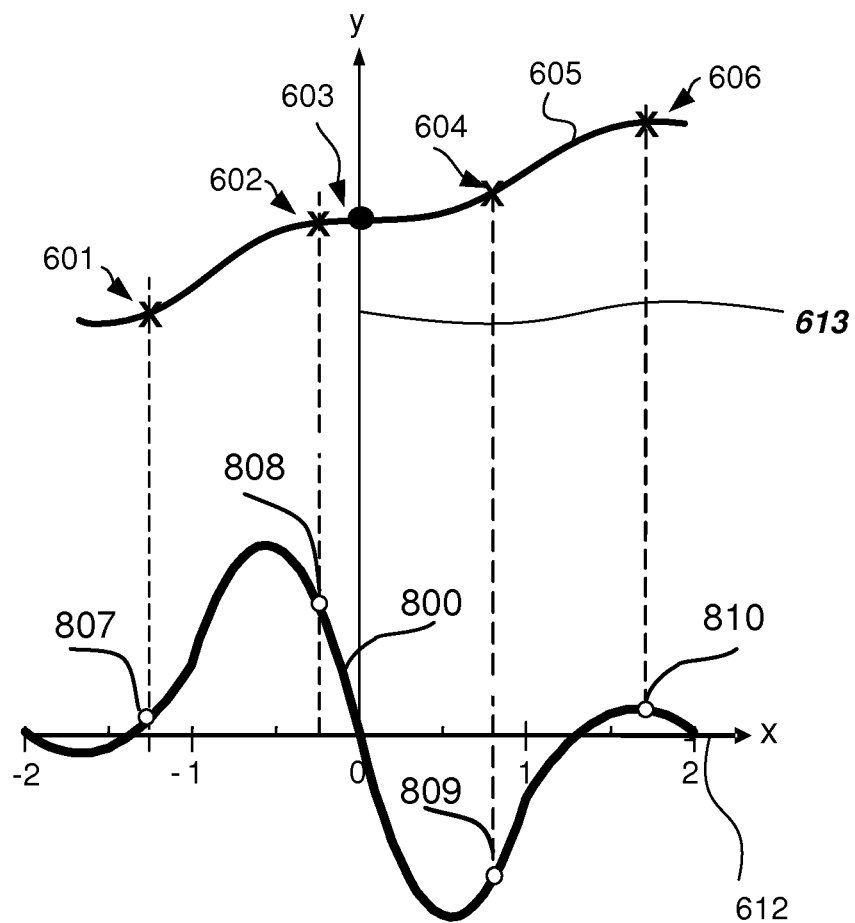
FIG. 9 shows the derivative interpolation process.

As is shown in FIG. 9, an estimation of the value of the derivative of the underlying continuous input signal (605) at a desired point (603) can be determined by multiplying the values of sampled signal with the coefficients of a kernel where the said coefficients 807, 808, 809 and 810 (respectively represented by D0, D1, D2 and D3 throughout this description) are samples at input sample locations 601, 602, 604 and 606 from a curve (800) which determined as the derivative of a continuous interpolation kernel. The IFKC method presented in this invention can also be used for efficient calculation of such derivative kernel coefficients.

Considering the symmetric Cubic function C(x,a) of equation (1), the corresponding derivative is an anti-symmetric function as follows:

$$C'(x, a) = \frac{\partial C(x, a)}{\partial x} = \begin{cases} \text{sgn}(x)(3(a+2)|x|^2 - 2(a+3)|x|) & 0 \le |x| < 1 \\ \text{sgn}(x)(3a|x|^2 - 10a|x| + 8a) & 1 \le |x| < 2 \\ 0 & 2 \end{cases}$$

where sgn(x) is −1 for all negative x (x<0) and is +1 for all non-negative x values (x≥0).

The coefficients of the derivative kernel (D0, D1, D2 and D3) can be determined by evaluating the following polynomials at point x $$D0(x,a)=C'(-2+x,a)=-3ax^2+2ax$$

$$D1(x,a)=C'(-1+x,a)=-3(a+2)x^2+(4a+6)x-a$$

$$D2(x,a)=C'(x,a)=3(a+2)x^2-2(a+3)x$$

$$D3(x,a)=C'(1+x,a)=3ax^2-4ax+a$$

Alternately, similar to IFKC process for interpolation (see FIG. 5), the derivative kernel coefficients can be determined more efficiently by directly evaluating the cheapest coefficient and determining the intermediate value P by evaluating the intermediate polynomial function P(x,a)=D1(x,a)+D2(x,a)=−D0(x,a)−D3(x,a)=2ax−a at point x. The sum of derivative kernel coefficients is zero (D1+D2+D3+D4=0) and the IFKC process may also reduce the cost of calculating derivative kernel coefficients by considering further inter-coefficient dependencies such as aD1(x,a)=−(a+2)D3(x,a)−P(x,a)+a For the most common form of Cubic function with a=−½, using the IFKC method the four derivative kernel coefficients (D0, D1, D2 and D3) can be calculated with one multiplier to find $x^2$, 8 addition (two of them increment or decrement by 1) and 6 shift operations.

Similarly, using the IFKC arrangement, the coefficients of the derivative kernel which is based on the derivative of B-spline kernel (shown in equation (22)) can be determined with one multiplier to find $x^2$ and 6 additions (two of them increment by one) and 4 shift operations when $$D0(x) = \frac{1}{2}x^2$$

is used in step 303, $$P(x) = -x + \frac{1}{2} = D1(x) + D2(x) = -D0(x) - D3(x)$$

is used in step 305 and $$D3(x)=-D0(x)-P(x)$$

$$D1(x)=3D3(x)+2P(x)+1$$

$$D2(x)=P(x)-D1(x)$$

is used in step 306 of IFKC arrangement.

Figure 8:
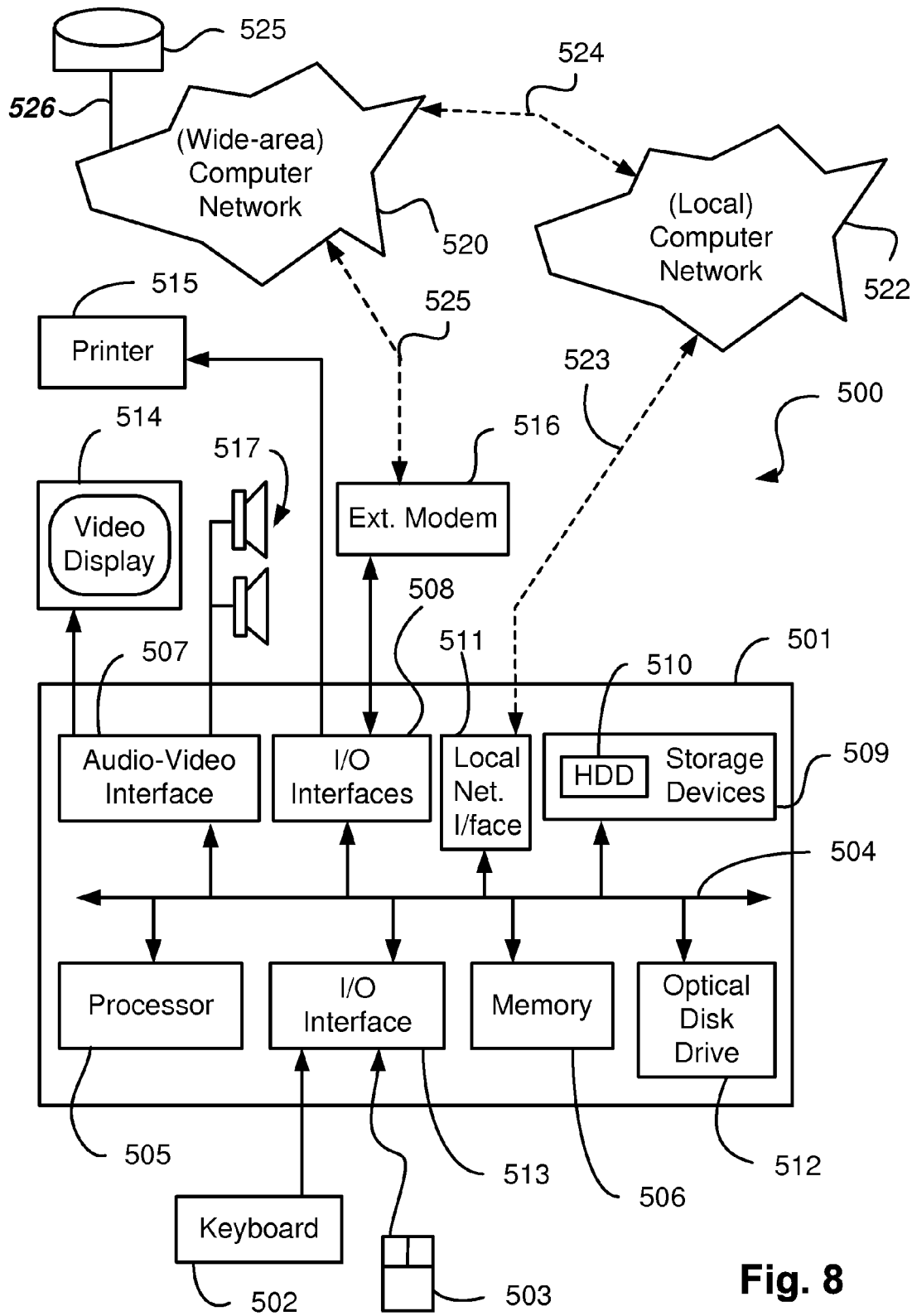
FIG. 8 is a schematic block diagram of a general purpose computer upon which arrangements described can be practiced.

FIG. 8 serves to show that although the disclosed IFKC arrangements are particularly advantageous for hardware implementation, they may alternatively be implemented using a computer system 500, wherein performance of the IFKC arrangements as depicted in FIGS. 5 and 7 may be implemented as software, such as one or more application programs executable within the computer system 500. In particular, the method steps of the IFKC arrangements are performed by instructions in the software that are carried out within the computer system 500.

The instructions may be formed as one or more code modules, each for performing one or more particular tasks. The software may also be divided into two separate parts, in which a first part and the corresponding code modules performs the IFKC arrangement methods, and a second part and the corresponding code modules manage a user interface between the first part and the user.

The software may be stored in a computer readable medium, including the storage devices described below, for example. The software is loaded into the computer system 500 from the computer readable medium, and then executed by the computer system 500. A computer readable medium having such software or computer program recorded on it is a computer program product. The use of the computer program product in the computer system 500 is an effective apparatus for performing the IFKC arrangements.

As seen in FIG. 8, the computer system 500 is formed by a computer module 501, input devices such as a keyboard 502 and a mouse pointer device 503, and output devices including a printer 515, a display device 514 and loudspeakers 517. An external Modulator-Demodulator (Modem) transceiver device 516 may be used by the computer module 501 for communicating to and from a remote server 525 over a communications network 520 via connections 521 and 526. The network 520 may be a wide-area network (WAN), such as the Internet or a private WAN. Where the connection 521 is a telephone line, the modem 516 may be a traditional "dial-up" modem. Alternatively, where the connection 521 is a high capacity (eg: cable) connection, the modem 516 may be a broadband modem. A wireless modem may also be used for wireless connection to the network 520.

The computer module 501 typically includes at least one processor unit 505, and a memory unit 506 for example formed from semiconductor random access memory (RAM) and read only memory (ROM). The module 501 also includes an number of input/output (I/O) interfaces including an audio-video interface 507 that couples to the video display 514 and loudspeakers 517, an I/O interface 513 for the keyboard 502 and mouse 503 and optionally a joystick (not illustrated), and an interface 508 for the external modem 516 and printer 515. In some implementations, the modem 516 may be incorporated within the computer module 501, for example within the interface 508. The computer module 501 also has a local network interface 511 which, via a connection 523, permits coupling of the computer system 500 to a local computer network 522, known as a Local Area Network (LAN). As also illustrated, the local network 522 may also couple to the wide network 520 via a connection 524, which would typically include a so-called "firewall" device or similar functionality. The interface 511 may be formed by an Ethernet™ circuit card, a wireless Bluetooth™ or an IEEE 802.21 wireless arrangement.

The interfaces 508 and 513 may afford both serial and parallel connectivity, the former typically being implemented according to the Universal Serial Bus (USB) standards and having corresponding USB connectors (not illustrated). Storage devices 509 are provided and typically include a hard disk drive (HDD) 510. Other devices such as a floppy disk drive and a magnetic tape drive (not illustrated) may also be used. An optical disk drive 512 is typically provided to act as a non-volatile source of data. Portable memory devices, such optical disks (eg: CD-ROM, DVD), USB-RAM, and floppy disks for example may then be used as appropriate sources of data to the system 500.

The components 505, to 513 of the computer module 501 typically communicate via an interconnected bus 504 and in a manner which results in a conventional mode of operation of the computer system 500 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 510 and read and controlled in execution by the processor 505. Intermediate storage of such programs and any data fetched from the networks 520 and 522 may be accomplished using the semiconductor memory 406, possibly in concert with the hard disk drive 510. In some instances, the application programs may be supplied to the user encoded on one or more CD-ROM and read via the corresponding drive 512, or alternatively may be read by the user from the networks 520 or 522. Still further, the software can also be loaded into the computer system 500 from other computer readable media. Computer readable media refers to any storage medium that participates in providing instructions and/or data to the computer system 500 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 501. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 514. Through manipulation of the keyboard 502 and the mouse 503, a user of the computer system 500 and the application may manipulate the interface to provide controlling commands and/or input to the applications associated with the GUI(s).

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

The invention claimed is:

1. A method for constructing, from a plurality of digital media signal input samples, at least one interpolated digital media input sample, by determining interpolation coefficients of a symmetric interpolation kernel, C, the method comprising the steps of:
    (a) determining a value x, proportional to a distance between the sample to be interpolated and one of the media signal input samples;
    (b) determining a first interpolation coefficient from the kernel and storing the first interpolation coefficient in a memory;
    (c) determining an intermediate value proportional to the sum of $C(x+L)$ and $C(x-L-1)$ where the parameter L is a non-negative integer in a kernel support interval;
    (d) determining a subsequent interpolation coefficient dependent upon the first interpolation coefficient and the intermediate value, to thereby construct, from the plurality of digital media signal input samples, the at least one interpolated digital media input sample; and
    (e) outputting or storing the at least one interpolated digital media input sample for further processing,
    wherein all of said steps are implemented using a computer.

2. A method according to claim 1, further comprising the step of constructing, from the plurality of digital media input samples, a derivative of at least one interpolated digital media input sample, by determining coefficients of a derivative kernel, for determining a derivative of a media signal.

3. A method according to claim 2 wherein the derivative kernel is an anti-symmetric kernel and is equal to derivative of interpolation kernel.

4. A method according to claim 2, wherein the derivative kernel is a derivative of a Cubic function defined to be zero outside the range (−2, 2).

5. A method according to claim 2, wherein the derivative kernel is a derivative of a piecewise Cubic B-spline function defined to be zero outside the range (−2, 2).

6. A method for constructing, from a plurality of digital media signal input samples, at least one interpolated digital media input sample, by determining interpolation coefficients of a symmetric interpolation kernel comprising continuous kernel segments, the method comprising the steps of:

(a) determining a first interpolation coefficient from the symmetric interpolation kernel and storing the first interpolation coefficient in a memory;
(b) determining a value of an intermediate function from symmetrically opposed segments of the kernel;
(c) determining a subsequent interpolation coefficient dependent upon the first interpolation coefficient and the value of the intermediate function, to thereby construct, from the plurality of digital media signal input samples, the at least one interpolated digital media input sample; and
(d) outputting or storing the at least one interpolated digital media input sample for further processing,
wherein all of said steps are performed using a computer.

7. A method according to claim 6, further comprising the steps of:
repeating the method steps (a)-(c) until no further coefficients are left to be determined; and
determining the inner product between the determined interpolation coefficients and the corresponding plurality of digital media signal input samples, thereby to construct the at least one interpolated digital media input sample.

8. A method according to claim 1, further comprising the step of determining a subsequent interpolation coefficient dependent upon at least one of the determined coefficients and the intermediate value.

9. A method according to claim 1, further comprising the step of determining the final interpolation coefficient dependent upon the determined coefficients.

10. A method according to claim 1, wherein the interpolation kernel is a Cubic function defined to be zero outside the range (−2, 2).

11. A method according to claim 1, wherein the interpolation kernel is a piecewise Cubic B-spline function defined to be zero outside the range (−2, 2).

12. A method according to claim 1, wherein the interpolation kernel is a piecewise Cubic function with fourth-order convergence rate defined to be zero outside the range (−3, 3).

13. A method according to claim 1, further comprising the steps of:
repeating the method steps (a)-(d) until no further coefficients are left to be determined; and
determining the inner product between the determined interpolation coefficients and the corresponding plurality of digital media signal input samples, thereby to construct the at least one interpolated digital media input sample.

14. An apparatus for determining interpolation coefficients of a symmetric interpolation kernel, C, from a plurality of media signal input samples to be used to determine an interpolated sample, the apparatus comprising:
means for determining a value x, proportional to a distance between the sample to be interpolated and one of the media signal input samples;
means for determining a first interpolation coefficient from the kernel and for storing the first interpolation coefficient in a memory;
means for determining an intermediate value proportional to the sum of $C(x+L)$ and $C(x−L−1)$ where the parameter L is a non-negative integer in a kernel support interval; and
means for determining a subsequent interpolation coefficient dependent upon the first coefficient and the intermediate kernel value.

15. An apparatus for determining interpolation coefficients of a symmetric interpolation kernel comprising continuous kernel segments, for interpolating a plurality of media signal input samples to be used to determine a desired output sample, the apparatus comprising:
means for determining a first interpolation coefficient from the symmetric interpolation kernel and for storing the first interpolation coefficient in a memory;
means for determining a value of an intermediate function from symmetrically opposed segments of the kernel; and
means for determining a subsequent interpolation coefficient dependent upon the first interpolation coefficient and the value of the intermediate function.

16. An apparatus for determining interpolation coefficients of a symmetric interpolation kernel from a plurality of media signal input samples to be used to determine an interpolated sample, the apparatus comprising:
a memory for storing a program; and
a processor for executing the program, said program comprising:
code for determining a value x, proportional to a distance between the sample to be interpolated and one of the media signal input samples;
code for determining a first interpolation coefficient from the kernel;
code for determining an intermediate value proportional to the sum $C(x+L)$ and $C(x−L−1)$ where the parameter L is a non-negative integer in a kernel support interval; and
code for determining a subsequent interpolation coefficient dependent upon the first coefficient and the intermediate kernel value.

17. An apparatus for determining interpolation coefficients of a symmetric interpolation kernel comprising continuous kernel segments, for interpolating a plurality of media signal input samples to be used to determine a desired input sample, the apparatus comprising:
a memory for storing a program; and
a processor for executing the program, said program comprising:
code for determining a first interpolation coefficient from the symmetric interpolation kernel and for storing the coefficient in memory;
code for determining a value of an intermediate function from symmetrically opposed segments of the kernel; and
code for determining a subsequent interpolation coefficient dependent upon the first interpolation coefficient and the value of the intermediate function.

18. A non-transitory computer-readable storage medium having recorded thereon a computer program for directing a processor to execute a method for constructing, from a plurality of digital media signal input samples, at least one interpolated digital media input sample, by determining interpolation coefficients of a symmetric interpolation kernel, the method comprising the steps of:
(a) determining a value x, proportional to a distance between the sample to be interpolated and one of the digital media signal input samples;
(b) determining a first interpolation coefficient from the kernel;
(c) determining an intermediate value proportional to the sum $C(x+L)$ and $C(x−L−1)$ where the parameter L is a non-negative integer in a kernel support interval; and
(d) determining a subsequent interpolation coefficient dependent upon the first coefficient and the intermediate kernel segment, to thereby construct, from the plurality of digital media signal input samples, the at least one interpolated digital media input sample.

19. A non-transitory computer-readable storage medium having recorded thereon a computer program for directing a processor to execute a method for constructing, from a plurality of digital media signal input samples, at least one interpolated digital media input sample, by determining interpolation coefficients of a symmetric interpolation kernel comprising continuous kernel segments, the method comprising the steps of:

(a) determining a first interpolation coefficient from the symmetric interpolation kernel;
(b) determining a value of the intermediate function from symmetrically opposed segments of the kernel; and
(c) determining a subsequent interpolation coefficient dependent upon the first interpolation coefficient and the value of the intermediate function, to thereby construct, from the plurality of digital media signal input samples, the at least one interpolated digital media input sample.

20. A television apparatus adapted to determine interpolation coefficients of a symmetric interpolation kernel from a plurality of media signal input samples to be used to determine an interpolated sample, the apparatus comprising:

a memory for storing a program; and
a processor for executing the program, said program comprising:
code for determining a value x, proportional to a distance between the sample to be interpolated and one of the media signal input samples;
code for determining a first interpolation coefficient from the kernel;
code for determining an intermediate value proportional to the sum $C(x+L)$ and $C(x-L-1)$ where the parameter L is a non-negative integer in a kernel support interval; and
code for determining a subsequent interpolation coefficient dependent upon the first coefficient and the intermediate kernel value.

21. A set top box apparatus adapted to determine interpolation coefficients of a symmetric interpolation kernel from a plurality of media signal input samples to be used to determine an interpolated sample, the apparatus comprising:

a memory for storing a program; and
a processor for executing the program, said program comprising:
code for determining a value x, proportional to a distance between the sample to be interpolated and one of the media signal input samples;
code for determining a first interpolation coefficient from the kernel;
code for determining an intermediate value proportional to the sum $C(x+L)$ and $C(x-L-1)$ where the parameter L is a non-negative integer in a kernel support interval; and
code for determining a subsequent interpolation coefficient dependent upon the first coefficient and the intermediate kernel value.

* * * * *